United States Patent [19]
Levillain et al.

[11] Patent Number: 6,079,688
[45] Date of Patent: Jun. 27, 2000

[54] ATTACHMENT OF A LOCK TO A SLIDE SECTION OF AN AUTOMOBILE VEHICLE SEAT

[75] Inventors: Gaétan Levillain, Flers; Samuel Levallois, Montsecret, both of France

[73] Assignee: Bertrand Faure Equipements S.A., Boulogne Cedex, France

[21] Appl. No.: 09/148,894

[22] Filed: Sep. 8, 1998

[30] Foreign Application Priority Data

Sep. 25, 1997 [FR] France .................................. 97 12103

[51] Int. Cl.$^7$ .................................................. F16M 13/00
[52] U.S. Cl. .................................................. 248/429
[58] Field of Search ................................ 248/429, 430

[56] References Cited

U.S. PATENT DOCUMENTS

| | | | |
|---|---|---|---|
| 4,301,988 | 11/1981 | Parizet . | |
| 4,563,044 | 1/1986 | Rees . | |
| 4,776,551 | 10/1988 | Nishino | 248/429 |
| 5,806,825 | 9/1998 | Couasnon | 248/429 |
| 5,855,349 | 1/1999 | Nini et al. | 248/429 |
| 5,918,847 | 7/1999 | Couasnon | 248/430 |
| 5,931,436 | 8/1999 | Rohee | 248/430 |

*Primary Examiner*—Ramon O. Ramirez
*Assistant Examiner*—David Heisey
*Attorney, Agent, or Firm*—Pollock, Vande Sande & Amernick

[57] ABSTRACT

An automobile vehicle seat slide includes a generally U-shaped female section having two substantially parallel flanges. The slide also has a generally U-shaped male section with two substantially parallel flanges that slide longitudinally between the flanges of the female section. A lock longitudinally locks the male section to the female section, the lock including an elastically flexible strip located inside the slide and having a first end portion that bears crenelations extending laterally beyond the flanges of the male section and passing through cutouts located in the male section flanges, the crenelations also engaging notches made in the flanges of the female section. The strip includes an attachment end portion located at a second end of the strip, opposite the first end. There is at least one pincer formation stamped in each male section flange for gripping a confronting surface of the attachment end portion thereby maintaining the 87strip against a base of the male section.

4 Claims, 1 Drawing Sheet

ATTACHMENT OF A LOCK TO A SLIDE SECTION OF AN AUTOMOBILE VEHICLE SEAT

FIELD OF THE INVENTION

The invention concerns the attachment of a lock to a slide section of an automobile vehicle seat. The slides enable the longitudinal position of the seat to be adjusted by the relative sliding of a male section in a female section and ensure locking in position once adjustment has been made.

BACKGROUND OF THE INVENTION

French Patent document FR-A-2736311, corresponding to U.S. Pat. No. 5,806,825 shows a position adjustment system using two such slides, not motorized. The male section, attached to the framework of the seat, is generally U-shaped with two flanges open at the bottom. The female section, attached to the floor of the automobile vehicle, is generally U-shaped with two flanges open at the top and generally includes, on at least one flange located on the notched flange side of the male section, a set of notches.

An elastically flexible strip is placed inside each slide and includes an end portion forming a lock, an intermediary portion and an attachment portion located at a distance from the end portion.

The lock includes crenelations which extend laterally beyond the flanges of the male section and passing through cutouts made for this purpose in the said flanges and which engage with the notches of the female section in locked position. To unlock the position adjustment system, a bar is actuated, this bar acting on the portion forming the lock of the strip to disengage the crenelations of the lock from the notches of the female section.

In the locked position of the system, all forces which tend to make the male section slide in the female section are transmitted directly from the cutouts in the male section to the crenelations of the lock and, from these, to the notches of the female section. On account of the direct proximity of the cutouts in the male section and the notches of the female section, the stresses in the flexible strip are limited only to the shear stresses of the crenelations of the lock, the other portions of the strip being submitted to no other stresses when this force is exerted.

Therefore, the attachment of the strip to the base of the male section can simply be achieved by riveting, crimping or screwing.

BRIEF DESCRIPTION OF THE INVENTION

The aim of the invention is to propose a new method for attaching the strip to the base of the male section enabling the number of parts required to attach the strip to be reduced to simplify assembly.

With these targets in mind, the subject of the invention is an automobile seat vehicle slide including:

- a U-shaped female section with two flanges,
- a U-shaped male section with two flanges, sliding longitudinally between the flanges of the female section,
- a lock longitudinally locking the male section in the female section, the lock consisting of an end portion of an elastically flexible strip placed inside the slide and including crenelations which extend laterally beyond the flanges of the male section by passing through cutouts made for this purpose in the flanges of the male section and which engage in the notches made in the flanges of the female section, the strip including an attachment portion remote from the end portion.

According to the invention, this slide is characterized in that the attachment portion of the strip is held against the base of the male section by at least one stamping made on each flange of the male section and mating with the edge of the attachment portion.

Thanks to the invention, the attachment of the strip requires no additional attachment components and the overall size of the attachment is then limited to the outer profile of the male section.

According to a preferential design, the stampings are made so as to press the edges of the attachment portion to longitudinally lock it in relation to the male section.

The stampings are, for example, made under the lower face of the attachment portion. The material offset by the stampings both laterally compresses the edges of the lower face of the attachment portion between the flanges of the male section and pushes the attachment portion against the base of the male section.

Again, preferentially, the edge of the attachment portion of the strip includes a set of teeth.

As the strip is made from a material harder than the material of the male section, for example, spring steel, the material offset by the stampings penetrates into the hollows of the teeth. The male section is then anchored in the attachment portion and the longitudinal locking of the attachment portion is improved.

Other characteristics and advantages of the invention will appear in the description which will follow of a design in compliance with the invention.

BRIEF DESCRIPTION OF THE DRAWINGS

Refer to the appended drawings on which.

DETAILED DESCRIPTION OF THE INVENTION

Figure 1:
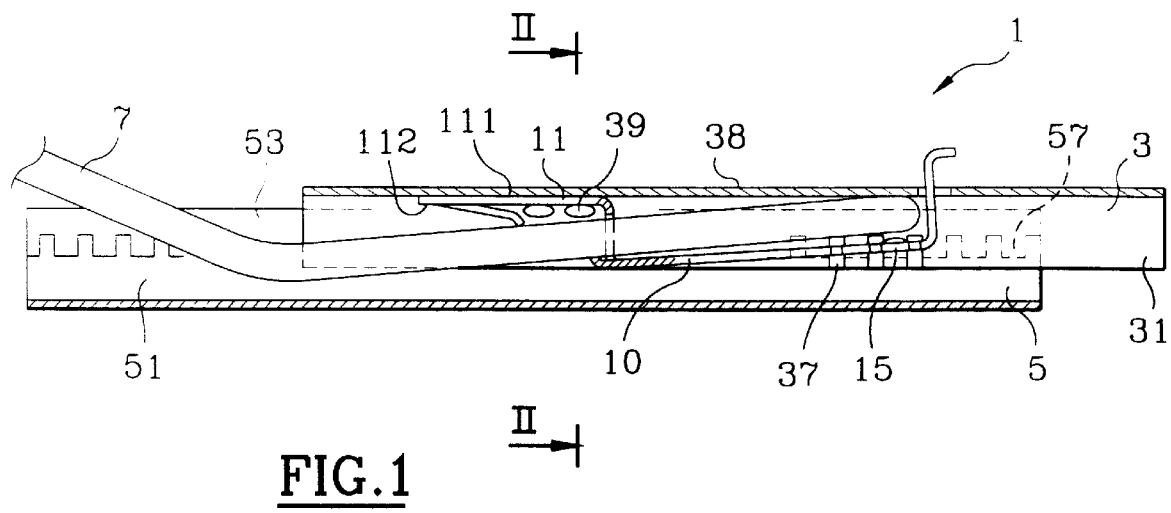
FIG. 1 shows a longitudinal cross-sectional view of a slide.

A system for adjusting the position of a seat conventionally includes two parallel slides such as slide 1 shown as an example on FIG. 1. Each slide 1 consists of a male section 3, attached to the framework of the seat (not shown), sliding in a female section 5 attached to the floor of the vehicle.

The female section 5 is generally U-shaped and open at the top, including two flanges 51 terminated by hook-shaped returns 53, turned towards the inside and the bottom of the section 5.

As can be seen on FIG. 1, the notches 57 are made, uniformly spaced along the complete length of the female section 5, on the edges of the hook-shaped returns 53.

The male section 3 is also generally U-shaped open at the bottom and includes two flanges 31 which are extended, towards the outside and upwards, by returns 33 which engage under the hook-shaped returns 53 of the female section 5. As shown on FIG. 2, the hook-shaped returns 53 of the female section 5 are adjacent to the flanges 31 of the male section 3.

The flange returns 33, 53 of the male section 3 and female section 5 respectively are shaped to comprise raceways for the balls 4, facilitating the relative longitudinal sliding of sections 3, 5.

The locking of slides 1 is ensured by an end portion 15 forming a lock of an elastically flexible strip 10, made, for example, from spring steel, placed inside the slide 1 and attached to the base of the male section 3 by an attachment portion 11 located at a distance from the end portion 15.

This end portion 15 includes crenelations 16 which extend laterally beyond the flanges of the male section 3 passing through the cutouts 37 which are made for this purpose, the crenelations 16 also engaging in the notches 57 of the female section.

An unlocking control bar 7 is provided to ensure the unlocking of the slides by acting on the end portion 15 forming the lock to disengage the crenelations 16 from the notches 57 of the female section 5. During unlocking, the crenelations 16 remain engaged with the cutouts 37 in the male section 3. During locking, any force tending to make the male section 3 slide in the female section 5 lead only to shear stresses on the crenelations 16 and the other portions of the strip 10 are submitted to no other stresses on account of a reduced operating clearance between the crenelations 16 and the cutouts 37. The elasticity of the strip 10 ensures the automatic locking of the slides 1 by the return of crenelations 16 engaged with the notches of the female section when the bar 7 is released.

For further details concerning the operation of such a locking system, it is also possible to refer to above mentioned French Patent document FR-A-2736311, corresponding to U.S. Pat. No. 5,806,825.

As shown on FIG. 1, the attachment portion 11 of the strip 10 is held against the base 38 of the male section 3 by two stampings 39 formed by a punch making an oblong-shaped print. The stampings 39 are made more or less at the same level and on the outside of each flange 31 of the male section 3.

Figure 2:
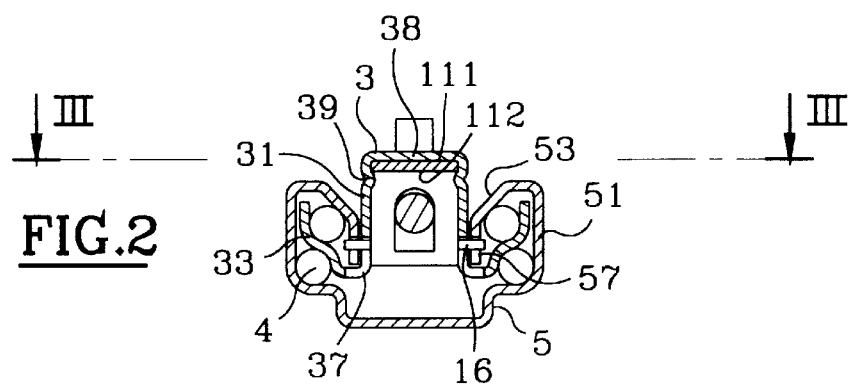
FIG. 2 shows a transverse cross-sectional view through line II—II of FIG. 1.

As shown on FIG. 2, these stampings 39 are made slightly under the attachment portion 11, for example, at a distance of 5 mm from the base 38 of the male section 3, that is, around 1 to 2 millimeters below the lower face 112 of the attachment portion 11.

In this way, the material offset by the stampings 39, towards the inside of the male section 3, compresses the edge of the lower face 112 between the flanges 31 of the male section 3 and also pushes the attachment portion 11 towards the base 38 of the section 3 by acting as a wedge, to place the upper face 111 of the attachment portion 11 against the said base 38.

Figure 3:
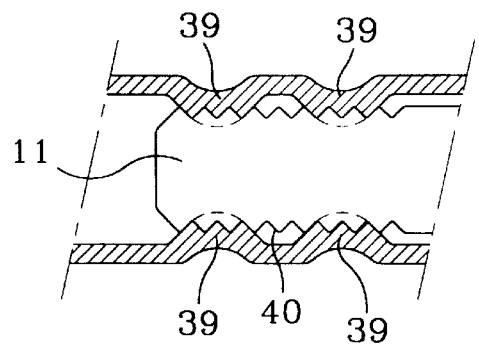
FIG. 3 shows a partial top view of the strip through line III—III of FIG. 2, showing the set of teeth made on the edge of the attachment portion.

To improve the longitudinal locking of the strip 10 in relation to the male section 3, a set of teeth 40 is made, as shown on FIG. 3, on the edge of the attachment portion 11. The teeth 40 are, for example, of a triangular shape and the material upset by the stampings 39 then penetrates into the hollows of the set of teeth 40 so that the male section 3 is anchored in the attachment portion 11.

Several stampings 39 can also be made in each flange 31 of the male section as shown on FIG. 3.

The presence of the stampings 39 enables the overall size of the attachment system to be limited to the outside profile of the male section 3 as no attachment portion protrudes beyond the section, unlike conventional attachment systems.

The invention is not limited to the design given simply as an example. In particular:

the stampings 39 could also be made so as to simply maintain the attachment portion 11 against the base 38 of the male section 3 whilst permitting a longitudinal movement of this attachment portion 11, if necessary. Indeed, the longitudinal positioning of the strip 10 in relation to the male section 3 is always ensured by the engagement of the crenelations 16 with the cutouts 37 made in the flanges 31 of the male section 3 whether the end portion 15, forming a lock, is unlocked or not. Also, this arrangement facilitates the movement of the crenelations 16 in the cutouts 37, by avoiding possible jamming which could result from a small operational clearance, in the longitudinal movement direction of the slide 1, between the crenelations 16 and the cutouts 37, the attachment system is transposable, by a, person skilled in the art, to slides the locking of which is achieved by a strip 10 different from the one described as an example.

What is claimed is:

1. An automobile vehicle seat slide comprising:

a generally U-shaped female section having two substantially parallel flanges;

a generally U-shaped male section having two substantially parallel flanges that slide longitudinally between the flanges of the female section;

a lock longitudinally locking the male section to the female section, the lock including an elastically flexible strip located inside the slide and having a first end portion bearing crenelations extending laterally beyond the flanges of the male section and passing through cutouts located in the male section flanges, the crenelations also engaging notches located in the flanges of the female section;

the strip including an attachment end portion located at a second end of the strip, opposite the first end; and at least one pincer formation stamped in each male section flange for gripping a confronting surface of the attachment end portion thereby securing the strip against a base of the male section.

2. The slide set forth in claim 1 where in the pincer formation grips the attachment portion with sufficient force to longitudinally clamp it to the male section.

3. The slide set forth in claim 1 wherein the confronting surface of the attachment end portion has at least one set of teeth formed therein that bites into a corresponding flange of the male section, after the pincer formations are stamped in each male section flange, thus increasing clamping of the attachment portion.

4. The slide set forth in claim 1 where in a plurality of pincer formations are stamped in each male section flange for gripping confronting surfaces of the attachment end portion.

* * * * *